United States Patent
Matcham et al.

(10) Patent No.: US 8,277,998 B2
(45) Date of Patent: Oct. 2, 2012

(54) WATER MANAGEMENT IN FUEL CELLS

(75) Inventors: Jeremy Stephen Matcham, West Sussex (GB); Nathan Grange, Derby (GB); Paul Alan Benson, Leicestershire (GB); Scott Baird, Norringham (GB); Ashley Kells, West Yorkshire (GB); Jonathan Cole, Leicestershire (GB); Paul L. Adcock, Leicestershire (GB); Peter David Hood, Leicestershire (GB); Simon Edward Foster, Leicestershire (GB)

(73) Assignees: Intelligent Energy Limited, Leicestershire (GB); Jeremy S. Matcham, West Sussex (GB)

( * ) Notice: Subject to any disclaimer, the term of this patent is extended or adjusted under 35 U.S.C. 154(b) by 1083 days.

(21) Appl. No.: 10/584,780

(22) PCT Filed: Dec. 31, 2004

(86) PCT No.: PCT/GB2004/005463
§ 371 (c)(1),
(2), (4) Date: Sep. 28, 2007

(87) PCT Pub. No.: WO2005/064727
PCT Pub. Date: Jul. 14, 2005

(65) Prior Publication Data
US 2008/0248336 A1 Oct. 9, 2008

(30) Foreign Application Priority Data
Dec. 31, 2003 (GB) .................................. 0330272.6

(51) Int. Cl.
*H01M 8/04* (2006.01)
*H01M 8/24* (2006.01)

(52) U.S. Cl. .......... 429/450; 429/408; 429/452; 429/457

(58) Field of Classification Search .................... None
See application file for complete search history.

(56) References Cited

U.S. PATENT DOCUMENTS 6,316,135 B1 * 11/2001 Breault et al. ................ 429/438
6,376,111 B1   4/2002 Mathias et al.
(Continued)

FOREIGN PATENT DOCUMENTS

CN          1347575         5/2002
(Continued)

OTHER PUBLICATIONS

GB Examination Report in Application No. 0330272.6, dated Jul. 27, 2006.

(Continued)

*Primary Examiner* — Barbara Gilliam
*Assistant Examiner* — Kwang Han
(74) *Attorney, Agent, or Firm* — Fish & Richardson P.C.

(57) ABSTRACT

An electrochemical fuel cell having an anode, an ion transfer membrane and a cathode has liquid water delivered to the fluid flow channels within the cathode so as to maintain a relative humidity of 100% throughout the fluid flow channels. A calibration method and apparatus is described for determining an optimum quantity or range of quantities of liquid water to be delivered to the cathode fluid flow channels under varying operating conditions. An operating method and apparatus is described that ensures an optimum quantity of liquid water is delivered to the cathode fluid flow channels under varying operating conditions.

14 Claims, 12 Drawing Sheets

U.S. PATENT DOCUMENTS

| | | | |
|---|---|---|---|
| 6,524,733 B1 * | 2/2003 | Nonobe | 429/413 |
| 6,835,477 B1 | 12/2004 | Brambilla et al. | |
| 2002/0102448 A1 | 8/2002 | Breault et al. | |
| 2002/0106546 A1 | 8/2002 | Perry | |
| 2003/0186093 A1 * | 10/2003 | St-Pierre et al. | 429/13 |

FOREIGN PATENT DOCUMENTS

| | | |
|---|---|---|
| DE | 25 33 215 | 1/1977 |
| DE | 100 36 916 | 2/2002 |
| EP | 0 316 626 | 5/1989 |
| GB | 2409763 | 1/2007 |
| JP | 2001-525596 | 12/2001 |
| JP | 2002-313387 | 10/2002 |
| JP | 2002-542591 | 12/2002 |
| JP | 2003-59516 | 2/2003 |
| JP | 2003-505851 | 2/2003 |
| JP | 2003-68337 | 3/2003 |
| WO | WO99/28985 | 6/1999 |
| WO | WO00/21153 | 4/2000 |
| WO | WO00/63992 | 10/2000 |
| WO | WO 00/63992 * | 10/2000 |
| WO | WO01/08246 | 2/2001 |
| WO | WO03/058745 | 7/2003 |
| WO | WO03/107465 | 12/2003 |
| WO | WO2004/006367 | 1/2004 |
| WO | WO2005/064727 | 7/2005 |

OTHER PUBLICATIONS

Response to Written Opinion of the EPO in Application No. 04806257.4, dated Sep. 13, 2006.
Examination Report in EP Application No. 04806257.4, dated Nov. 19, 2007.
Reply to EP Examination Report [dtd. Nov. 19, 2007] in Application No. 04806257.4, dated Mar. 13, 2008.
Chinese Office Action in Application No. 200480042225.8, dated Nov. 23, 2007 (with English translation).
Russian Office Action in Application No. 2006127407, dated Jun. 26, 2008 (with English translation).
Examination Report in Argentinian Patent Application No. 040104954, dated Apr. 29, 2011 (with English translation).
International Preliminary Report on Patentability (incl. Written Opinion) in Application No. PCT/GB2004/005463, dated Jul. 3, 2006.
UK Search Report for Priority Application GB 0330272.6, Jan. 27, 2005.
Search Report for PCT/GB2004/005463, Mar. 16, 2006.
Machine Translation of Japanese Publication No. 2001-525596 (Pub: Dec. 2001).
Machine Translation of Japanese Publication No. 2002-313387 (Pub: Oct. 2002).
Machine Translation of Japanese Publication No. 2002-542591 (Pub: Dec. 2002).
Machine Translation of Japanese Publication No. 2003-505851 (Pub: Feb. 2003).
Machine Translation of Japanese Publication No. 2003-59516 (Pub: Feb. 2003).
Machine Translation of Japanese Publication No. 2003-68337 (Pub: Mar. 2003).
Response filed in Argentinian Patent Application No. 040104954, dated Apr. 29, 2011.
Response filed in Argentinian Patent Application No. 040104954, dated Sep. 7, 2011.
Argentine Examination Report dated Jun. 8, 2011(with brief English summary).
Office Action in Canadian Patent Application No. 2,551,674, dated May 17, 2011.
Response to Office Action in Canadian Patent Application No. 2,551,674, dated Oct. 24, 2011.
Notification of Reasons for Refusal in Japanese Patent Application No. 2006-546338, dated May 11, 2011 (with English translation).
Response filed in Japanese Patent Application No. 2006-546338, dated Sep. 12, 2011.
Notification of Reasons for Refusal in Japanese Patent Application No. 2006-546338, dated Mar. 7, 2012 (with English translation).
Non-Final Rejection in Korean Patent Application No. 10-2006-7015526, dated Aug. 20, 2011 (English translation).
Response filed in Korean Patent Application No. 10-2006-7015526, dated Oct. 19, 2011.

* cited by examiner

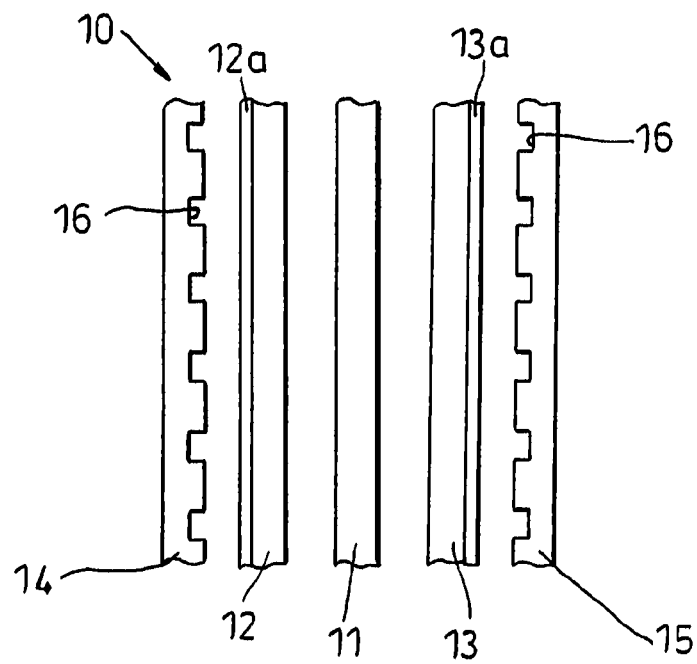
Fig. 1
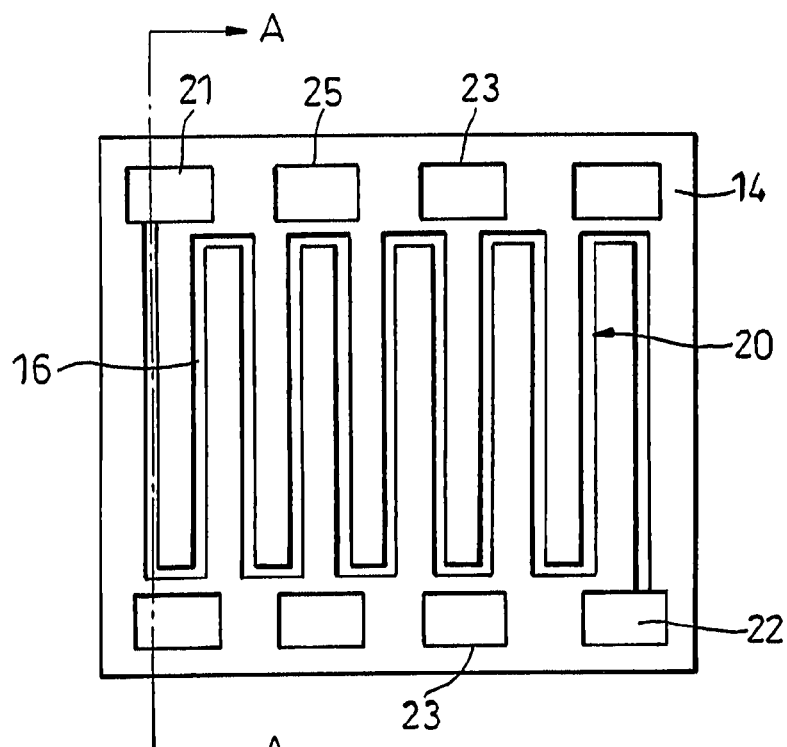 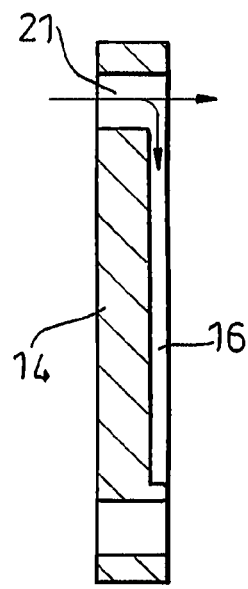
Fig. 2(a) Fig. 2(b)

WATER MANAGEMENT IN FUEL CELLS

The present invention relates to electrochemical fuel cells, such as solid polymer electrolyte fuel cells, which convert fuel and oxidant into electrical energy and a reaction product.

A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15. Intermediate backing layers 12a and 13a may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water.

The fluid flow field plates 14, 15 are formed from an electrically conductive, non-porous material by which electrical contact can be made to the respective anode electrode 12 or cathode electrode 13. At the same time, the fluid flow field plates must facilitate the delivery and/or exhaust of fluid fuel, oxidant and/or reaction product to or from the porous electrodes. This is conventionally effected by forming fluid flow passages in a surface of the fluid flow field plates, such as grooves or channels 16 in the surface presented to the porous electrodes 12, 13.

With reference also to FIG. 2(a), one conventional configuration of fluid flow channel provides a serpentine structure 20 in a face of the anode 14 (or cathode 15) having an inlet manifold 21 and an outlet manifold 22 as shown in FIG. 2(a). According to conventional design, it will be understood that the serpentine structure 20 comprises a channel 16 in the surface of the plate 14 (or 15), while the manifolds 21 and 22 each comprise an aperture through the plate so that fluid for delivery to, or exhaust from, the channel 16 can be communicated throughout the depth of a stack of plates in a direction orthogonal to the plate as particularly indicated by the arrow in the cross-section on A-A shown in the FIG. 2(b).

Other manifold apertures 23, 25 may be provided for fuel, oxidant, other fluids or exhaust communication to other channels in the plates, not shown.

The channels 16 in the fluid flow field plates 14, 15 may be open ended at both ends, ie. the channels extending between an inlet manifold 21 and an outlet manifold 22 as shown, allowing a continuous throughput of fluid, typically used for a combined oxidant supply and reactant exhaust. Alternatively, the channels 16 may be closed at one end, ie. each channel has communication with only an input manifold 21 to supply fluid, relying entirely on 100% transfer of gaseous material into and out of the porous electrodes of the MEA. The closed channel may typically be used to deliver hydrogen fuel to the MEA 11-13 in a comb type structure.

With reference to FIG. 3, a cross-sectional view of part of a stack of plates forming a conventional fuel cell assembly 30 is shown. In this arrangement, adjacent anode and cathode fluid flow field plates are combined in conventional manner to form a single bipolar plate 31 having anode channels 32 on one face and cathode channels 33 on the opposite face, each adjacent to a respective membrane-electrode assembly (MEA) 34. The inlet manifold apertures 21 and outlet manifold apertures 22 are all overlaid to provide the inlet and outlet manifolds to the entire stack. The various elements of the stack are shown slightly separated for clarity, although it will be understood that they will be compressed together using sealing gaskets if required.

In order to obtain high and sustained power delivery capability from a fuel cell, it is generally necessary to maintain a high water content within the membrane-electrode assembly, and in particular within the membrane.

In the prior art, this is conventionally achieved by humidifying the feed gases, either fuel, air or both, fed via manifolds 21, 22 or 23 and channels 16. In other words, water in the vapour phase (hereinafter 'gaseous water') is introduced into the channels 16. This also can also contribute, to some limited extent, to heat management within the fuel cell assembly.

Another method is to deliver water in the liquid phase (hereinafter 'liquid water') directly to the membrane 11, 34, e.g. directly to the electrode surfaces or into the channels 16 of the bipolar plates 31. This technique has the advantage of not only supplying the water to maintain a high membrane water content but can also act to cool significantly the fuel cell through evaporation and extraction of latent heat of vaporisation. A detailed description of techniques for introducing liquid phase water directly to the electrode surfaces or into the channels 16 has been described in international patent application no. PCT/GB03/02973 (unpublished at the time of filing this application). Relevant parts of that document are therefore reproduced herein where appropriate.

This direct heat removal process that provides for the extraction of thermal energy via the exit gas stream has distinct advantages associated with the elimination of intermediate cooling plates within the fuel cell stack assembly.

It is an object of the present invention to provide a method and apparatus for providing improved operation of an evaporatively cooled fuel cell stack through introduction of excess water into the channels 16 of the cathode electrode.

According to one aspect, the present invention provides a method of operating an electrochemical fuel cell having an anode, an ion transfer membrane and a cathode, comprising the steps of:
delivering fluid fuel to fluid flow channels within the anode;
delivering fluid oxidant to fluid flow channels within the cathode;
exhausting reaction by-products and any unused oxidant from the fluid flow channels within the cathode; and
delivering a sufficient quantity of liquid water to the fluid flow channels within the cathode such that a relative humidity of 100% is maintained substantially throughout the fluid flow channels.

According to another aspect, the present invention provides an electrochemical fuel cell assembly comprising:
at least one anode fluid flow field plate having fluid flow channels therein;
at least one ion transfer membrane;
at least one cathode fluid flow field plate having fluid flow channels therein;
means for delivering fluid fuel to the anode fluid flow channels;
means for delivering fluid oxidant to the cathode fluid flow channels;
a water injection mechanism for delivering a sufficient quantity of liquid water to the fluid flow channels within the cathode such that a relative humidity of 100% is maintained substantially throughout the fluid flow channels during normal operating conditions of the fuel cell.

Embodiments of the present invention will now be described by way of example and with reference to the accompanying drawings in which:

FIG. 1 shows a schematic cross-sectional view through a part of a conventional fuel cell;

FIGS. 2(a) and 2(b) respectively show a simplified plan and sectional view of a fluid flow field plate of the fuel cell of FIG. 1;

Figure 10:
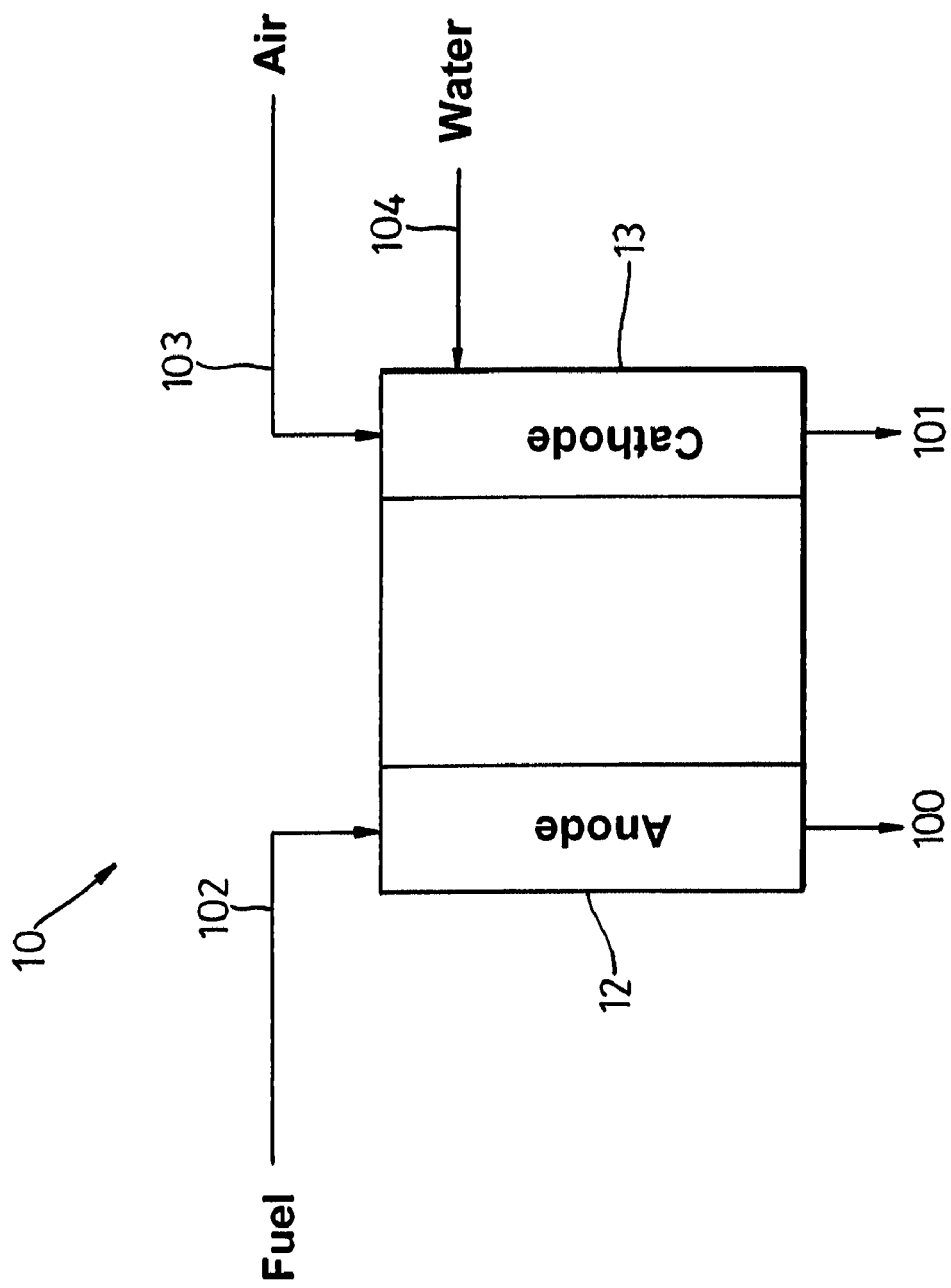
FIG. 10 is a schematic diagram illustrating the principles of water cooling of the cathode of a fuel cell.

During operation of a fuel cell stack assembly 30, heat is generated within the fuel cell stack as a consequence of electrochemical and electrical losses. In an example of an evaporatively cooled fuel cell 10 in a stack assembly, shown schematically in FIG. 10, this heat is removed via an increase in temperature of the exhaust products 100, 101 over the inlet temperature of the reactants 102, 103 and by the vaporisation of liquid water 104 supplied to the cathode 13 and evaporated into the cathode air stream 103. At all but the lowest power levels, evaporative cooling is found to be the dominant mechanism for heat removal.

Evaporation of liquid water 104 will occur if the partial pressure of gaseous water in the cathode air stream is low enough, i.e. at conditions of relative humidity<100%, and there is a supply of heat to vaporise the liquid water. Once the local conditions are such that the relative humidity of water is 100%, i.e. the air is saturated with water vapour, no further evaporation will occur unless any of the following three conditions prevail: (i) the air flow rate is increased such that the partial pressure of gaseous water is lowered in inverse proportion; (ii) the total pressure is lowered such that the partial pressure of gaseous water is lowered proportionally; and (iii) the local temperature increases such that the equilibrium point is shifted whereby more evaporation may occur until the air becomes fully saturated.

Therefore, for a fuel cell 10 operating with excess water at the cathode 13 at each location in the fuel cell stack 30, at constant pressure and with a constant cathode air flow rate, the local equilibrium conditions are such that the air is fully saturated and any further heat removal through evaporation can only be effected by an increase in local temperature.

Figure 11:
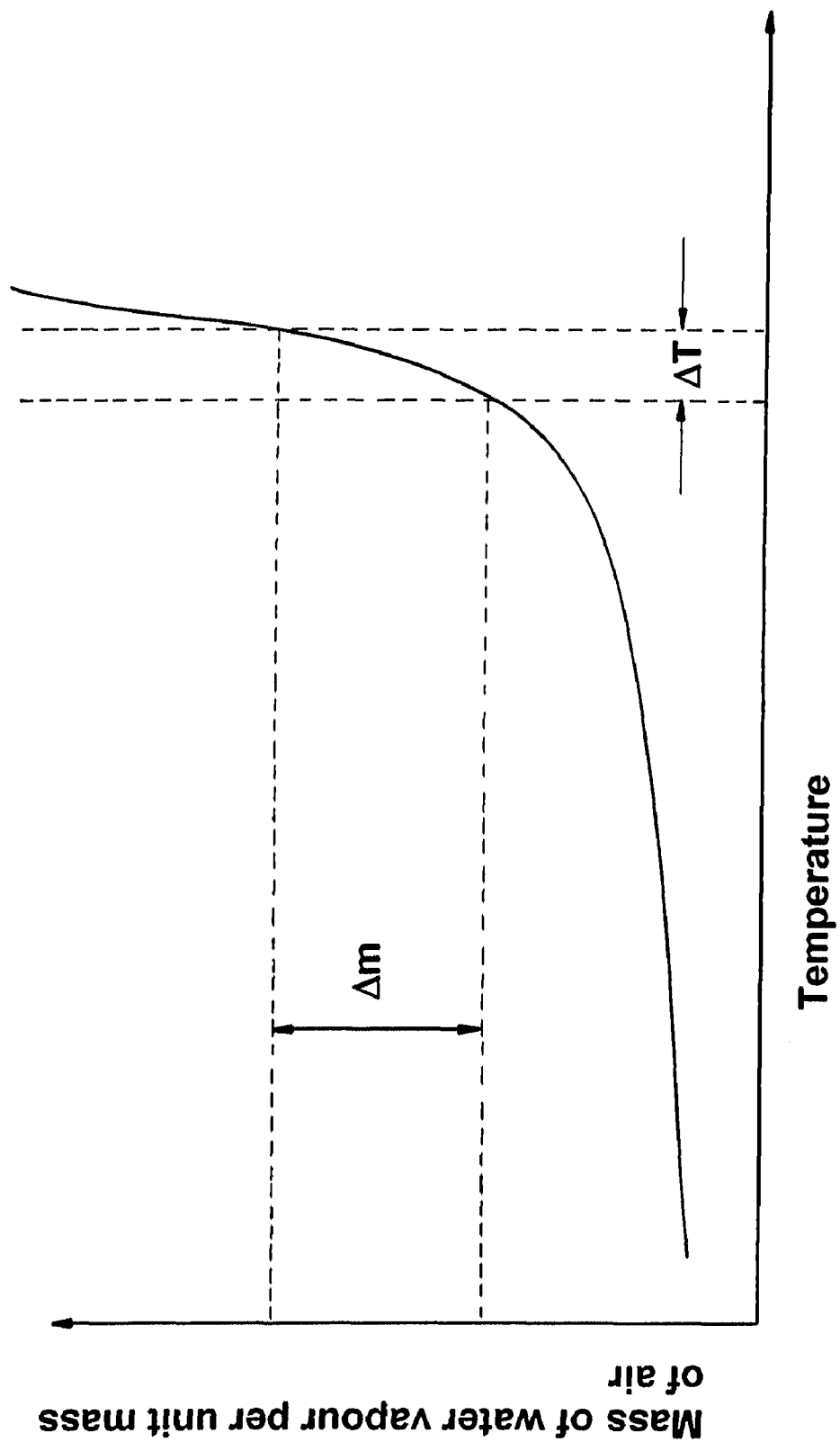
FIG. 11 is a graph illustrating the variation in mass of gaseous water per unit mass of air as a function of temperature for fully saturated conditions, i.e. at 100% relative humidity.

The actual increase in temperature to effect evaporation, and therefore cooling, depends on the sensitivity of the equilibrium point for evaporation at the prevailing conditions and the degree of cooling required. FIG. 11 shows, schematically, the variation in mass of gaseous water per unit mass of air with temperature for fully saturated conditions, i.e. at conditions of 100% relative humidity and at constant total pressure. In this way, the operating temperature of the stack is largely set by the amount of evaporation required to effect cooling and the total pressure and mass flow rate of the cathode air stream.

As shown in FIG. 11, at higher temperatures, a small increase in temperature $\Delta T$ leads to a significant increase $\Delta m$ in the amount of gaseous water that can be held in the air stream and therefore in the amount of evaporation that can occur as a result of heat generated within the stack. Therefore, the temperature of the stack will remain approximately constant for a wide range of heat loads, both globally (i.e. as the total stack power is varied) and locally (i.e. due to variations in local heat generation rate as a consequence of non-uniformities within the stack for a given total stack power). This gives a high degree of implicit control over the stack operating temperature and leads to a good thermal balance being maintained across the stack.

Additionally, the presence of excess water within individual channels 16 or passages in the fuel cell stack assembly 30 gives rise to implicit control of the air flow rate within each channel as follows. If a given passage has a higher than average air flow rate, then additional water can be evaporated into the air flow to provide additional cooling if required. This leads to a higher than average volume flow rate at exit from the flow passage which, in the presence of a uniform pressure drop across all flow passages, limits the air flow rate into the cell passage providing implicit regulation of the air flow leading to improved stack thermal balance and hence improved stack cell voltage balance. A uniform pressure drop across all channels 16 is generally provided by the relative dimensions of the manifolds 21, 22 and the channels 16.

Explicit control of the stack temperature can be achieved if required through moderation of the cathode air flow rate and/or through modification of the total pressure of the cathode air stream. In other words, the air flow rate can be increased, thereby lowering the partial pressure of water vapour, by increasing the volume of air into which the water can vaporise. Therefore, additional water can be vaporised before saturation occurs, creating additional cooling and resulting in a lower stack operating temperature.

Alternatively, or in addition, the outlet pressure can be reduced. This will again lower the partial pressure of water vapour, by lowering the total pressure. This has the effect of shifting the equilibrium point such that additional water can be vaporised before saturation is reached, creating additional cooling and resulting in a lower stack operating temperature.

Other factors, such as the anode flow rate, fuel and oxidant input temperature, surface losses etc., are found to be less significant.

In a preferred embodiment of a predominantly unpressurised system, the typical operating temperature of the fuel cell stack is in the range 70 to 80 degrees C. However, in principle, this value can be varied in the range 65 to 95 degrees C. through adjustment of the air flow rate and/or total pressure of the cathode air stream. At low power levels, where evaporative cooling is not dominant, the operating temperature of the stack can be significantly cooler. Operating the system at higher or lower pressures will enable significant variation in the temperature ranges quoted above.

In practice, the average temperature of the reactants and liquid water supplied to the fuel cell stack can be lower than the stack operating temperature. Therefore, some cooling will be provided by the heating of these input flows to the stack operating temperature. Once the input flows have reached the stack operating temperature, the remainder of the cooling will be provided by evaporation of the liquid water into the cathode air stream. The proportion of evaporative cooling is dependent on a number of factors including the cathode air flow rate, the water flow rate, the fuel cell stack power and the temperature of the inlet flows. In most cases, evaporative cooling is the dominant cooling mechanism leading to a high degree of implicit temperature control as previously explained. However, for cases where the average temperature of the inlet flows is lower than the stack operating temperature, there will be a temperature gradient in the stack in the region where the reactants and liquid water are input.

For evaporative cooling to be effective, there must be sufficient liquid water present at each part of the fuel cell stack. If insufficient water is present then the performance of the stack will be reduced with potentially serious consequences.

Possible problems include: (i) drying of the membrane, leading to a lower voltage across the relevant cell; and (ii) hotspots caused by the absence of liquid water and hence lack of evaporative cooling, leading to deterioration of the membrane and a reduction in life.

In order to ensure that sufficient liquid water is present to effect cooling through evaporation, alternative strategies can be adopted: (i) precise metering of liquid water to the cathode such that there is exactly enough water to maintain a relative humidity of 100% across the entire surface of the cathode and in each cell of the fuel cell stack; or (ii) over-supply of liquid water to the entire stack such that there is always excess water present across the entire surface of the cathode and in each cell of the fuel cell stack. To achieve adequate delivery of liquid water to the cathode, water injection points may be provided for each and every cathode channel 16 as will be illustrated later.

In practical fuel cells, the precise metering of liquid water to each part of the fuel cell stack is difficult to achieve. Additionally, manufacturing tolerances and non-uniform operating conditions lead to differing requirements for cooling at each location in the fuel cell stack thereby exacerbating the difficulties associated with precise metering.

Therefore, the over-supply of liquid water to the cathode such that there is always excess liquid water present at the cathode at each location within the stack is the preferred method since this ensures that drying of the membrane and hotspots are avoided, leading to improved stack performance and life.

Thus, in one general aspect, the supply of excess liquid water to the cathode ensures that a relative humidity of 100% is maintained substantially throughout the fluid flow channels in the cathode.

In another aspect, the fuel cell is operated such that, for any measured cell power delivery, liquid water injection rate into the cathode and/or gas flow through the cathode are controlled to ensure that there is more liquid water at all regions of the cathode surface than can be evaporated in the prevailing temperature and pressure conditions.

In another aspect, the above conditions are applied to a plurality of such cells in a fuel cell stack having a common oxidant supply manifold and a common water injection manifold such that, for any measured stack power delivery, liquid water injection rate into the water injection manifold and/or gas flow rate in the oxidant supply manifold are controlled to ensure that there is more liquid water at all regions of the cathode surfaces of all cells than can be evaporated in the prevailing temperature and pressure conditions.

For a practical stack subject to real non-uniformities and under normal operating conditions with a water factor of less than unity, it will be appreciated that some parts of the stack could be receiving less liquid water than is required to maintain a relative humidity of 100% substantially throughout the fluid flow channels in the cathode. Correspondingly, there may be some parts of the stack which are receiving more liquid water than is required to maintain a relative humidity of 100% substantially throughout the fluid flow channels in the cathode. Therefore, in another aspect of the invention, the supply of excess liquid water to the stack is selected such that all parts of the stack will receive at least the minimum amount of liquid water required to maintain a relative humidity of 100% substantially throughout the fluid flow channels in the cathode, corresponding to a water factor of greater than unity for the stack.

Figure 12:
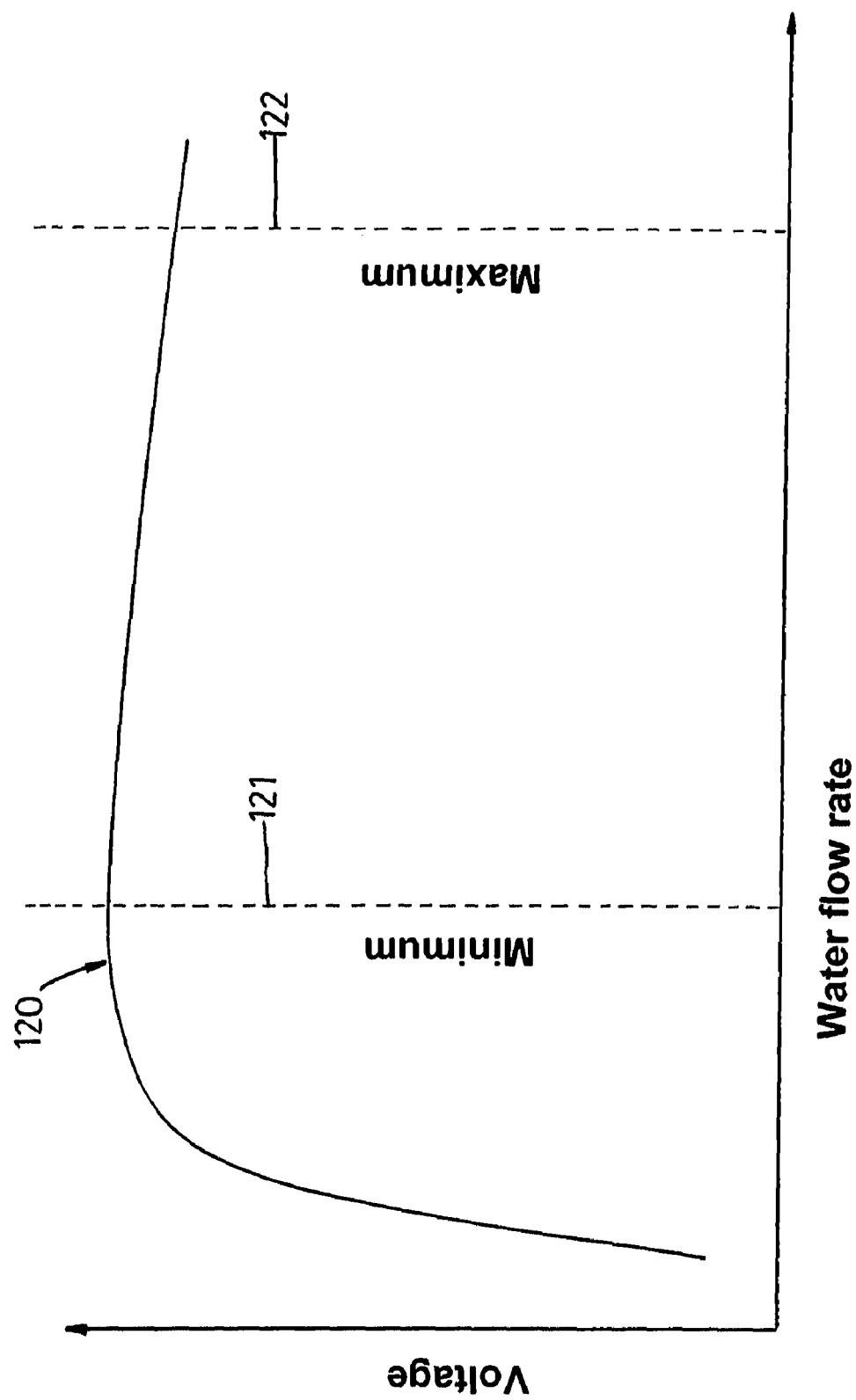
FIG. 12 is a graph illustrating the variation in a fuel cell stack voltage as a function of the flow rate of liquid phase water supplied to the cathode.

FIG. 12 shows, schematically, the variation in stack voltage as a function of the flow rate of liquid water supplied to the cathode for a typical evaporatively cooled fuel cell stack, operating at constant current and constant cathode air flow rate. At low water flow rates, the overall stack voltage is reduced, indicating that some parts of the stack may not be receiving sufficient liquid water to ensure adequate cooling and/or adequate membrane hydration. As the water flow rate is increased, a maximum in stack voltage (indicated at label 120) is achieved whereby water is being delivered in excess quantities to all parts of the fuel cell stack. At higher water flow rates, the stack voltage is gradually reduced, possibly as a consequence of the resulting lower partial pressure of the oxygen in the cathode air stream (being displaced by water) and/or possibly as a consequence of the blockage of gas transport to or from the membrane by the presence of liquid water.

Also at higher flow rates, the cell balance (as indicated by cell voltage monitoring) can deteriorate indicating an upper limit to the maximum water factor that can be used for the stack. It is also possible that the maximum water flow rate may be set by the maximum achievable using a suitable water pump.

Despite these limiting effects, it has been determined that a large operating window can be defined where significant amounts of excess water can be supplied to the cathode ensuring adequate hydration and cooling of each part of the fuel cell stack.

It is helpful to describe the quantity of water delivered to the cathode as a multiple of the theoretical minimum amount required for evaporative cooling, i.e. a 'water factor' WF is hereby defined in which:

$$WF = m_w / m_w(\text{minimum})$$

where $m_w$ is the mass flow rate of liquid water delivered, and $m_w(\text{minimum})$ is the theoretical minimum mass flow rate of liquid water as calculated below.

The theoretical minimum amount of water required for evaporative cooling can be calculated by performing a heat balance on the fuel cell and assuming that:

(i) the enthalpy of reaction is equal to the lower heating value of the fuel, since gaseous water is produced as a product (in the absence of excess water);

(ii) the heat load on the fuel cell is derived from an experimental value of fuel cell stack efficiency as a function of stack current;

(iii) the heat load is equal to the thermal enthalpy rise of the products over the reactants including complete evaporation of liquid water supplied to the cathode.

The actual water factor for a given operating point can therefore be defined as a multiple of this value.

It will be appreciated that the water factor could be defined in other ways than the definition given above, which could result in slightly different preferred ranges of values of water factor, according to the definition used.

Figure 13:
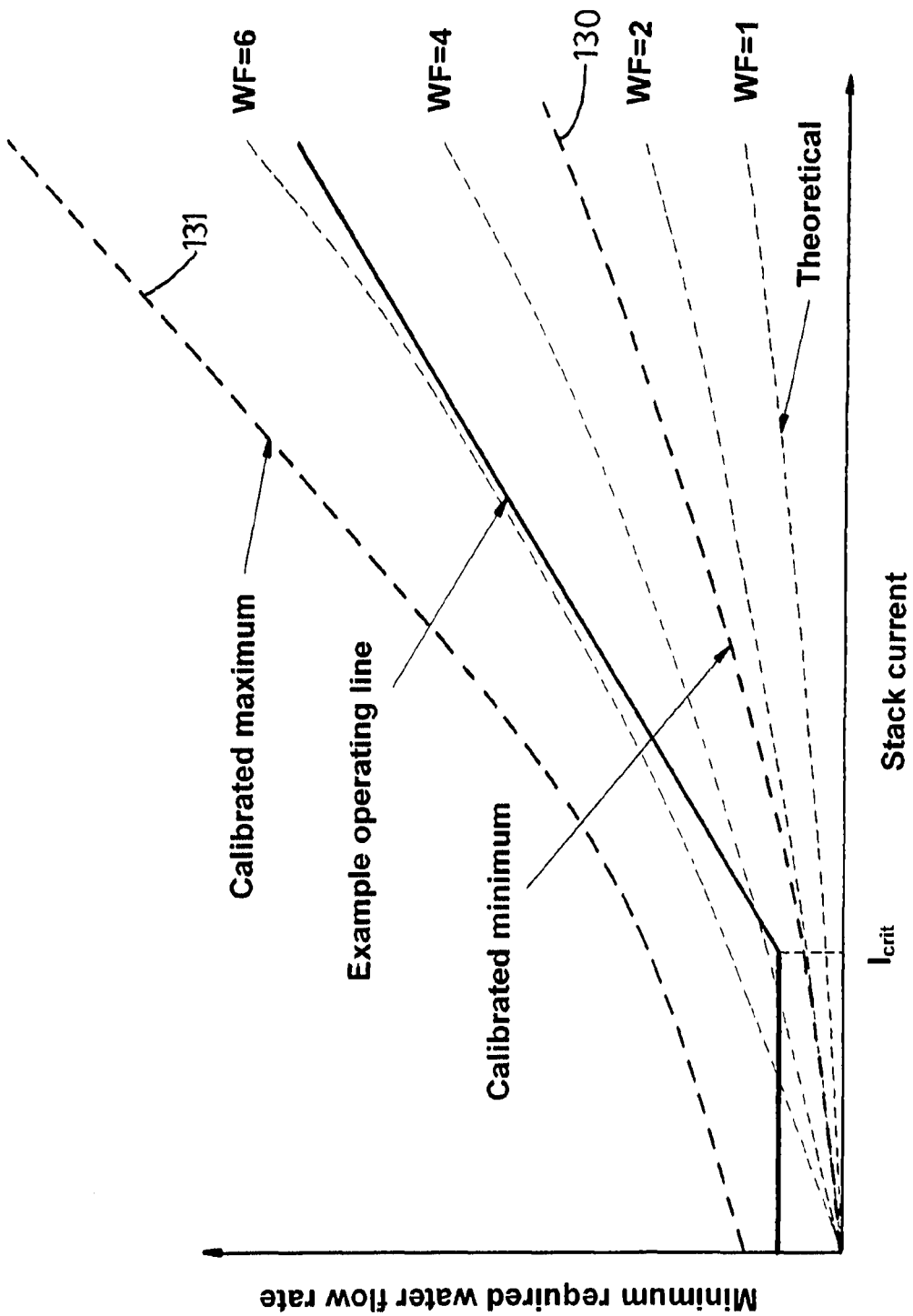
FIG. 13 is a graph illustrating the theoretical minimum water flow rate required as a function of fuel cell stack current.

FIG. 13 shows, schematically, the theoretical minimum liquid water flow rate required as a function of stack current, i.e. a locus of points of unity water factor, labelled WF=1. As the stack current is increased, the amount of water required increases non-linearly, as the efficiency of the stack is reduced at higher stack currents leading to a non-linear increase in the amount of heat generated.

As discussed, stack non-uniformities and the effect of these on water flow rate for optimum performance (as shown between lines 121 and 122 of FIG. 12), dictate that a practical fuel cell stack in which separate metering of water delivery to each location within the stack is not possible must therefore be operated with a minimum water factor that allows a margin for the non-uniformities. In other words, the water factor used must be sufficiently greater than unity to ensure that all cells in the stack, and all parts of each cell in the stack, achieve 100% relative humidity. The maximum water factor used is dictated by a maximum acceptable drop off in performance. Preferred lower and upper limits of the water factor WF as a function of stack current are shown schematically as dashed lines 130 and 131 in FIG. 13.

The upper and lower limits 130, 131 of water factor may be determined via testing or calibration of the relevant fuel cell stack 30. Calibration of a stack can be achieved through variation of the water flow rate to the cathode operating at constant current and constant air stoichiometry to determine the minimum water flow rates indicated by line 121 and the maximum water flow rates indicated by line 122. This calibration is repeated for a range of possible stack currents (and possibly also for a range of allowable air stoichiometries) that will correspond to a normal range of operating conditions of the stack. Thus, the calibration defines upper and lower limits of water factor as a function of stack current.

The expression 'air stoichiometry' as used herein refers to the amount of oxygen supplied at the input 103 normalised by the amount of oxygen consumed in the electrochemical reaction. Thus, for an air stoichiometry of 1, all of the oxygen in the air is combined with hydrogen to form water. For a stoichiometry of 2, 50% of the oxygen is consumed in the cell 10 and 50% is present in the cathode exhaust 101. The amount of oxygen required for the reaction is a direct function of stack power, stack efficiency and the energy change associated with the reaction.

In a mass manufacturing environment, it is also possible to test a number of representative stacks in order that a single set of limits with suitable error margins may be determined that will be acceptable for all stacks of a given configuration.

In a preferred embodiment, the cathode air flow rate 103 is adjusted in proportion to the stack current such that the stack operates with an air stoichiometry of approximately 2, set by electrochemical requirements. In practice, however, the cathode air flow rate can be varied such that the air stoichiometry is within the range 1.1 to 10, and more preferably within the range 1.4 to 4, depending on the precise requirements of the fuel cell stack. At low currents, and hence low consumption of reactants in the cell, the air stoichiometry can be significantly higher than these values, since the minimum air flow rate is limited by the minimum flow rate delivery of the air compressor.

In a preferred embodiment, the water flow rate is set to be a linear function of stack current as shown schematically in FIG. 13. The water factor for this control strategy varies generally in the range 1.5 to 40, and more preferably in the range 3 to 6.

In practice, the water factor can be set anywhere in the range 0 to 40 depending on the operating conditions of the stack and the acceptable maximum drop-off in stack performance as a consequence of excess water (refer to FIG. 12). For example, if the stack is operating at low power output or is being started from cold conditions and has therefore not reached its maximum operating temperature, the water flow rate may be set to zero or a low water factor to temporarily increase the rate of heating of the stack.

Monitoring of the cathode exhaust temperature can be used to indicate the stack operating temperature and provide feedback control for the water feed pump. Thus, in one aspect, the system may temporarily permit delivery of a quantity of liquid water to the fluid flow channels within the cathode such that a relative humidity of less than 100% (water factor<1) is maintained when the cathode exhaust temperature is below a predetermined threshold corresponding to a sub-optimal operating temperature, or for a predetermined period following cold start of the fuel cell.

A metering pump, flow controller or a pressure control method can be used to regulate the water feed rate. At low power levels, the amount of water required might be lower than the minimum flow rate obtainable with the water pump. Therefore, at low power levels a minimum water flow rate could be set corresponding to the minimum voltage set point for the water pump to prevent the pump from stalling. This is shown schematically in FIG. 13 for values of current less than $I_{crit}$.

It will be appreciated that the amount of water delivered to the fuel cell stack can, in principle, follow any function of current provided that the flow rate lies within the minimum and maximum levels of water factor determined by calibration of the relevant fuel cell stack or of a number of representative fuel cell stacks.

Once a water factor control strategy has been defined, additional flexibility in cooling can be achieved through adjustment of the cathode air flow rate and/or cathode air total pressure.

Additionally, the stack can be equipped with cell voltage monitoring capability such that the operational voltage is used as an indicator of insufficient or excess water, the necessary adjustments being made in real time.

An exemplary arrangement for implementing water management in a fuel cell stack is now described in connection with FIG. 14.

A fuel cell system 140 includes a fuel cell stack 30 having a fuel input line 102, an anode exhaust line 100, an air feed line 103, a water injection line 104 and a cathode exhaust line 101. The fuel input line is fed from a fuel source 141, possibly via a humidifier 142 according to well known principles. The anode exhaust line 100 may be fed directly to ambient 143, or may be at least partially recycled according to known principles using a recycle control loop 144. The air feed line 103 is fed by an air compressor 145. The water injection line 104 is supplied by a water pump 146. Water can be supplied from an appropriate purified water supply or recycled from the cathode exhaust by way of a suitable condenser (not shown). The cathode exhaust line 101 may be directed to ambient, and preferably includes an exhaust sensor 147 which senses at least exhaust temperature.

The cathode exhaust may include a pump 148 for reducing and/or controlling the cathode exhaust pressure. The pump 148 may be in addition to, or instead of, a pumped air supply from compressor 145, i.e. the air supply could otherwise be at ambient pressure.

Also included within the fuel cell system 140 is a controller 150 which preferably receives sensor inputs corresponding to stack voltage 151, stack current 152 and exhaust temperature 153. The controller 150 is also coupled to the air compressor 145 and water injection pump 146 by way of suitable control lines.

The controller 150 may be configured to operate in two possible modes.

In a first mode, the controller 150 may be adapted to obtain calibration data for subsequent operation of the fuel cell stack 30. In a calibration mode, the controller 150 varies water flow supplied by the water injection pump 146 under conditions of constant input air pressure and constant current drawn from the fuel cell stack, and receives sensed voltage levels of the stack to thereby determine appropriate maximum and minimum water factors 121, 122 (FIG. 12). These values are stored in calibration table 154. The calibration may be repeated for one or more of different current loads, different input air pressures, different air stoichiometries to compile a comprehensive set of control data suitable for controlling the water injection rate for a range of fuel cell operating conditions.

In a second mode, the controller 150 is adapted to use the calibration data stored in calibration table 154 in order to maintain optimum running conditions of the fuel cell stack. For example, the controller 150 is adapted to monitor stack voltage and current, and to control the water injection pump 146 (and possibly also the inlet air compressor) to maintain an appropriate water factor for optimum performance of the fuel cell. In preferred arrangements, this water factor lies in the range 1.5 to 40, and more preferably in the range 3 to 6.

As previously described, the controller may also monitor cathode exhaust temperature by way of sensor 147, and deliver a smaller quantity of water when the cathode exhaust temperature is below a predetermined threshold corresponding to a sub-optimal operating temperature, e.g. during start up of the fuel cell. In another example, this 'warm-up' phase could be controlled by a timer rather than by exhaust temperature.

Figure 14:
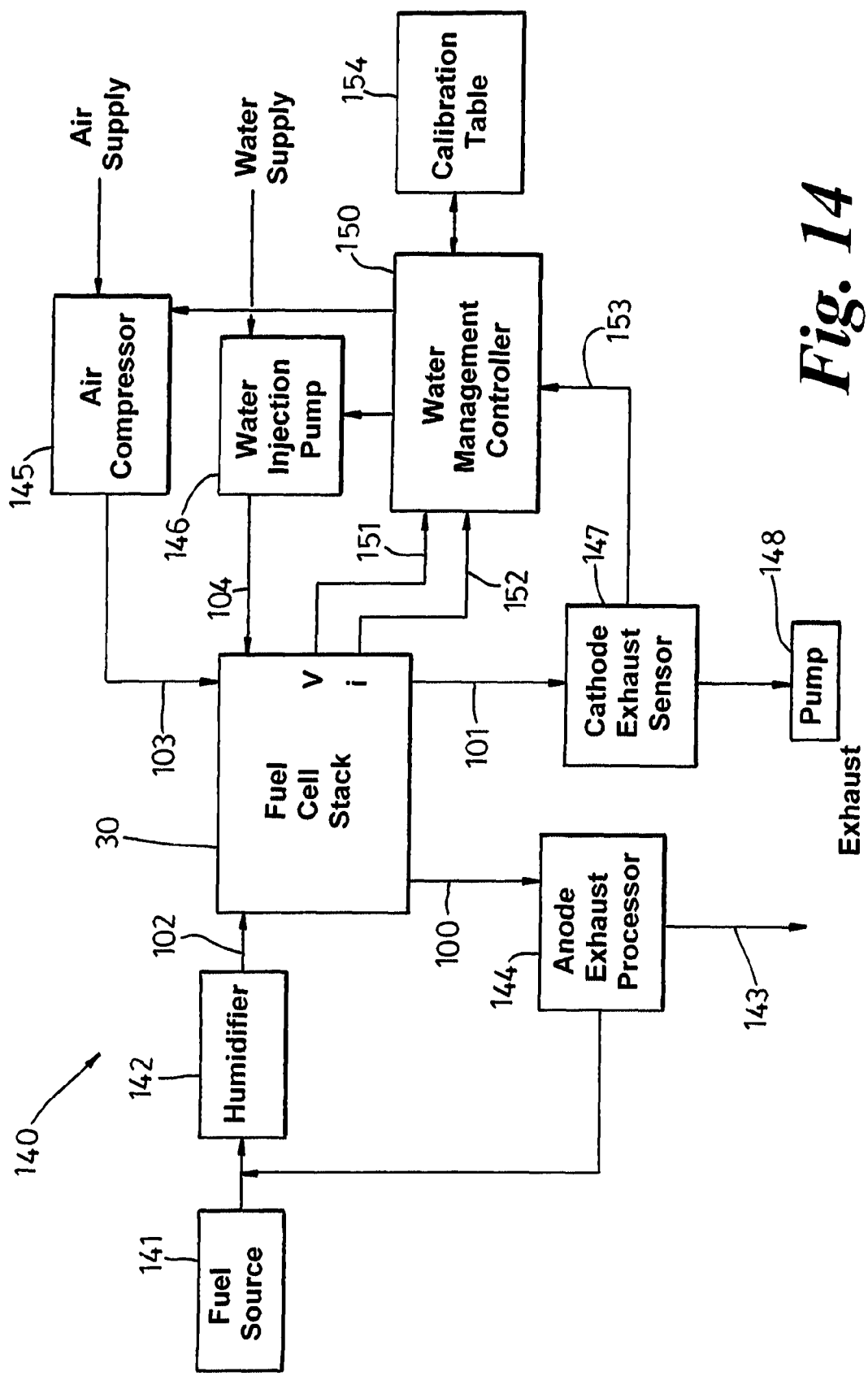
FIG. 14 is a schematic diagram of components of a fuel cell stack system including a water delivery management system.

In the exemplary embodiment of FIG. 14, the controller is adapted to perform both initial calibration of the fuel cell stack, and maintenance of optimal running conditions. It will be recognised, however, that for known fuel cell types, or pre-calibrated systems, the calibration table 154 could be preloaded with operating data for use by the water management controller 150.

Although the exemplary embodiment of FIG. 14 shows 'global' control of the fuel cell stack 30 by the controller 150, it will be understood that a finer granularity of control could be achieved where water delivery to different cells, or to different cell groups is possible. For example, where there are multiple, independently controlled water delivery points to the fuel cell stack, separate voltage and current sensing may be effected to locally vary the water delivery to each part of the fuel cell stack.

A number of mechanisms are possible for delivering liquid water in precisely controlled quantities to fluid flow channels in the cathode fluid flow field plates. Exemplary mechanisms are described in PCT/GB03/02973 (unpublished at the time of filing this application), details of which are described hereinafter with reference to FIGS. 4 to 9.

Figure 3:
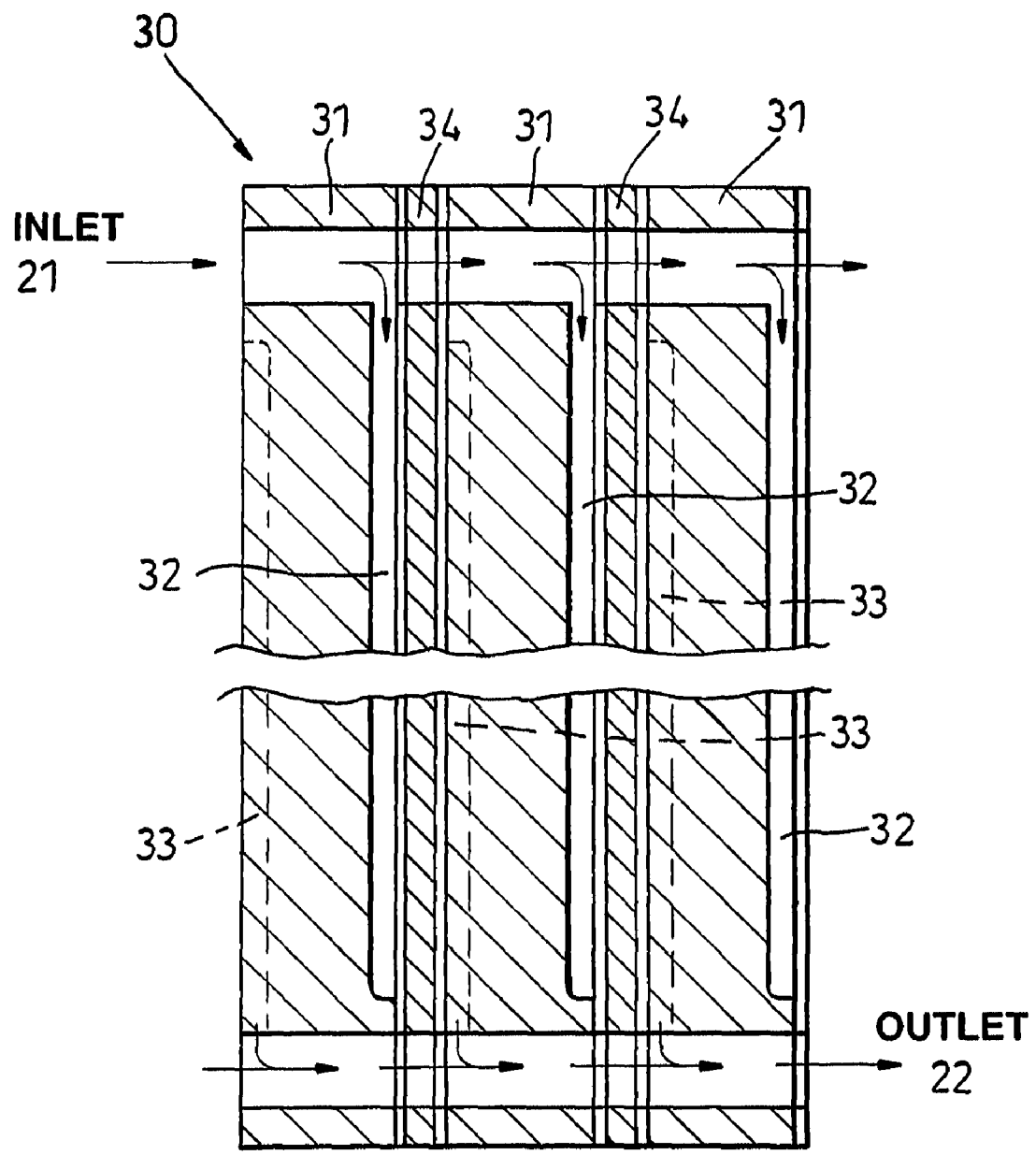
FIG. 3 shows a cross-sectional view through a conventional fuel cell stack with bipolar plates.
Figure 4A:
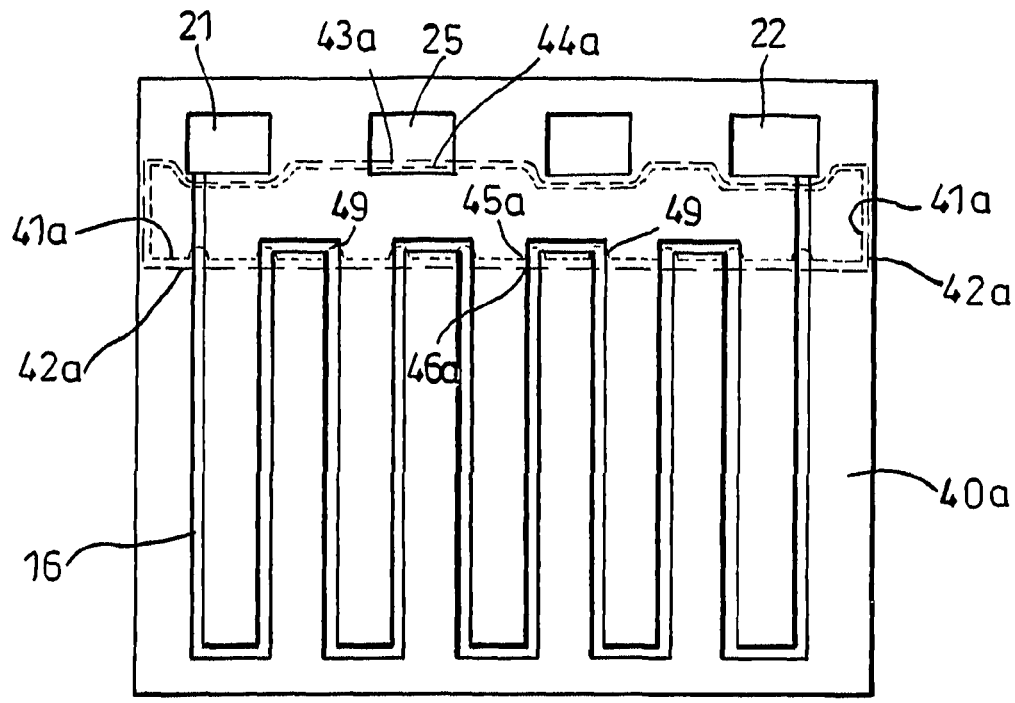
FIG. 4(a) shows a plan view of a fuel cell fluid flow field plate with a serpentine fluid conduit, showing in outline the overlay position of a water distribution foil and cover foil.
Figure 4B:
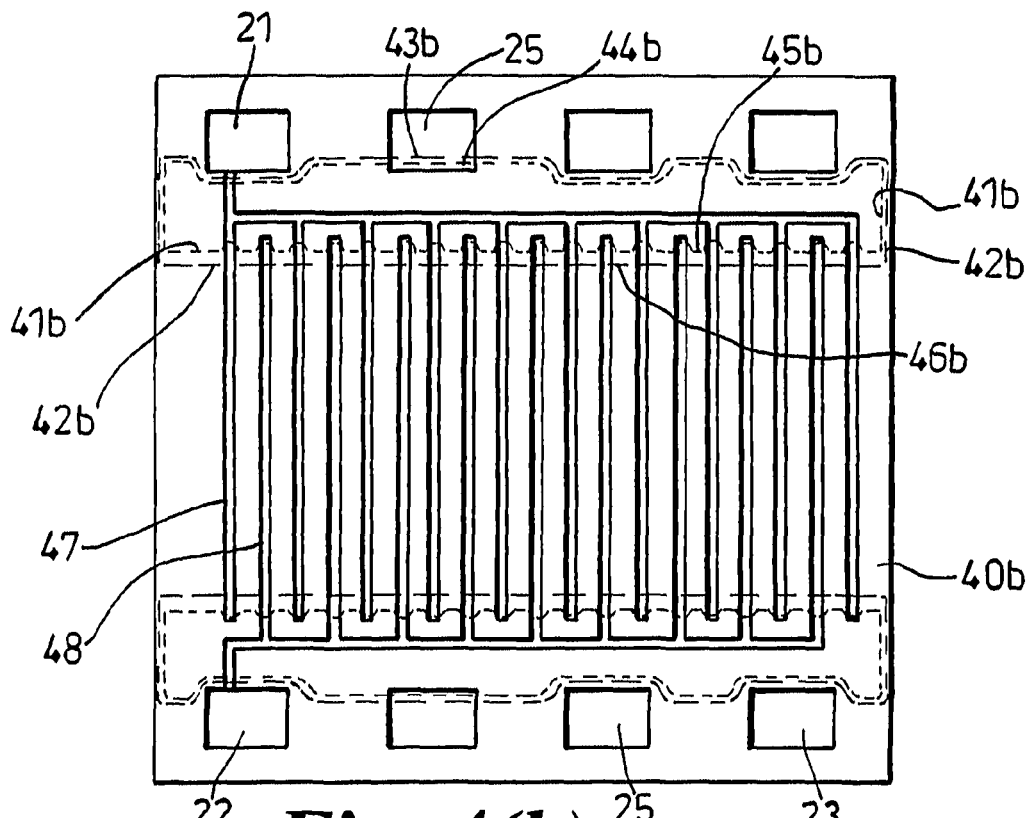
FIG. 4(b) shows a plan view of a fuel cell fluid flow field plate with interdigitated comb fluid conduit, showing in outline the overlay position of a water distribution foil and cover foil.

With reference to FIGS. 4(a) and 4(b), the present invention provides a series of water injection conduits extending between a water inlet manifold 25 and the individual channels 16 of a fluid flow field plate 40a or 40b. Generally speaking, the water injection conduits are provided by way of a membrane or laminated structure which lies on the surface of the fluid flow field plate 40. The water injection conduits are provided with inlets communicating with the water inlet manifold 25 and outlets which define predetermined water injection points over the channels 16 in the fluid flow field plate.

In a preferred arrangement, the laminated structure is provided in the form of two foil layers 41, 42 overlying the plate 40, the position of which foils are shown in dashed outline in FIGS. 4(a) and 4(b).

FIG. 4(a) illustrates a plan view of a fluid flow field plate 40a with serpentine channel 16, with foils 41a, 42a having first edges 43a, 44a coincident with the water inlet manifold 25, and second edges 45a, 46a located at or adjacent to predetermined water injection points 49 of the channels 16.

FIG. 4(b) illustrates a plan view of a fluid flow field plate 40b with two interdigitated comb channels 47, 48 each communicating with a respective manifold 21, 22, and foils 41b, 42b having first edges 43b, 44b coincident with the water inlet manifold 25, and second edges 45b, 46b located at or adjacent to predetermined water injection points of the channel 47. It will be noted that the foils may be repeated on the opposite edge of the plate 40b between a second water inlet manifold 25 and predetermined water injection points on the channel 48.

Figure 5:
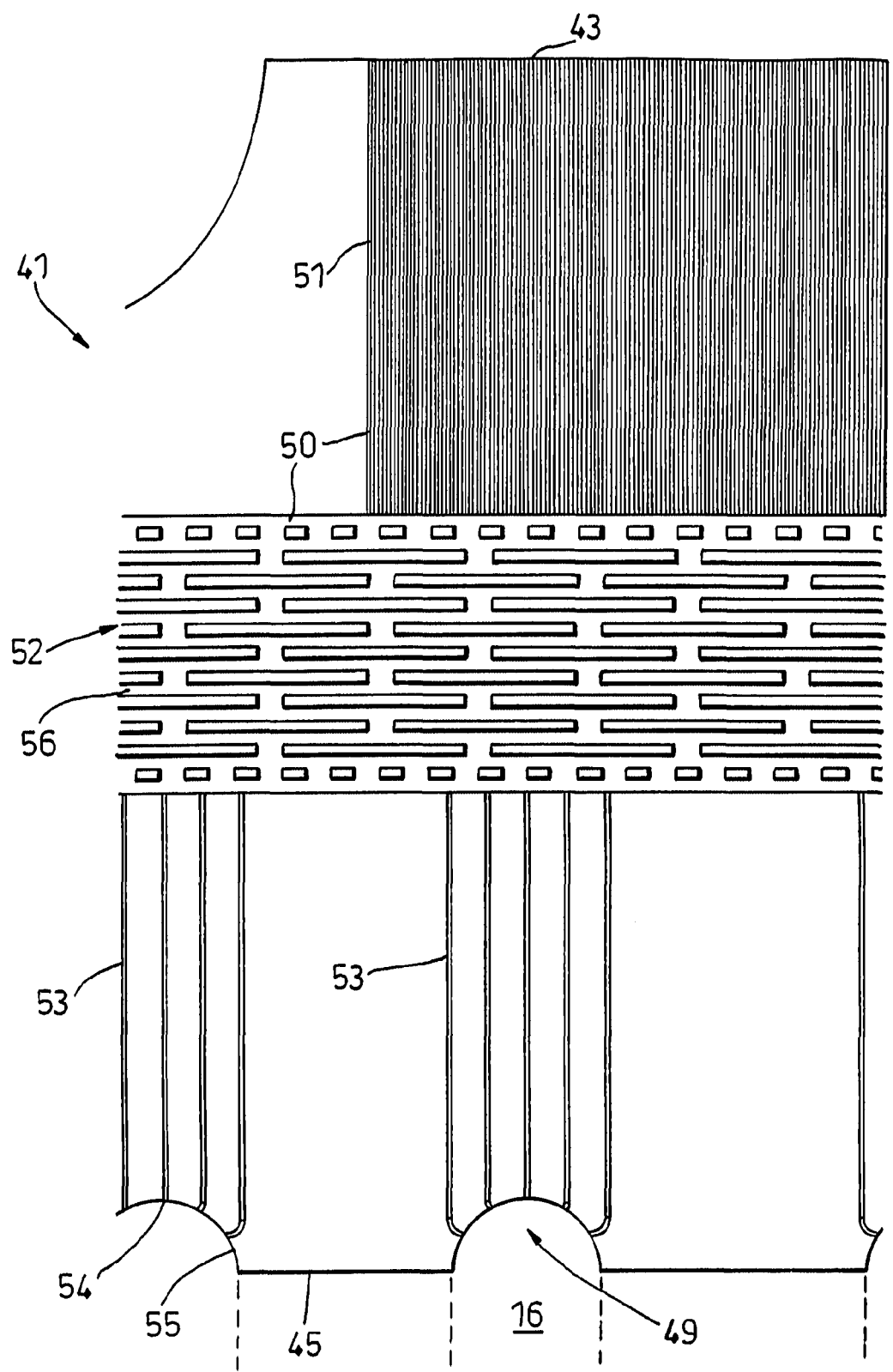
FIG. 5 shows a plan view of a water distribution foil.

FIG. 5 shows a detailed plan view of the water distribution foil 41 layout, illustrating the preferred paths of the water injection conduits 50. The conduits 50 are formed by a first series of channels 51 which extend from the first edge 43 of the foil 41 located at the water inlet manifold 25, to a pressure distribution gallery or plenum 52 that extends along the length of the water injection foil 41. The pressure distribution gallery 52 communicates with a second series of channels 53 which extend to the second edge 45 of the foil for communication with the channels 16 in the fluid flow field plate. For this purpose, the second series of channels 53 are grouped to terminate at respective convergence structures 54 at the second edge 45 of the water injection foil 41.

In the preferred embodiment as illustrated, the convergence structures 54 comprise arcuate recesses 55 cut into the second edge 45 of the foil 41 at water injection points 49 adapted to be coincident with predetermined positions over channels 16, shown in outline on the figure.

The pressure distribution gallery 52 preferably comprises an array of intercommunicating channels 56 which baffle the incoming water from the first series of channels 51 and effectively distribute it along the entire length of the foil 41 so that each group of the second series of channels 53 receives water at a substantially similar pressure.

Referring back to FIGS. 4(a) and 4(b), the cover foil 42 comprises an unpatterned foil (ie. without channels) of substantially similar peripheral shape to the lower foil. The cover foil 42 extends beyond the edge of the distribution foil 41 at least at the ends of the second series of channels to ensure that water is directed downwards into the desired flow field plate channel 16. Most conveniently, this overlap is achieved by the recesses 55 being formed in the distribution foil 41, but not in the cover foil 42. Thus, as best seen in the cross-sectional diagram of FIG. 6, in exaggerated form, the cover foil 42 forms a top closure to the channels 51, 52 and 53 to form the water injection conduits 50, leaving open the ends of the channels 51 and 53. In the embodiment shown, the cover foil 42 may be formed slightly larger than the distribution foil 41 such that it overlaps the second edge 45 (and possibly the first edge 43) to achieve a similar effect.

Figure 6:
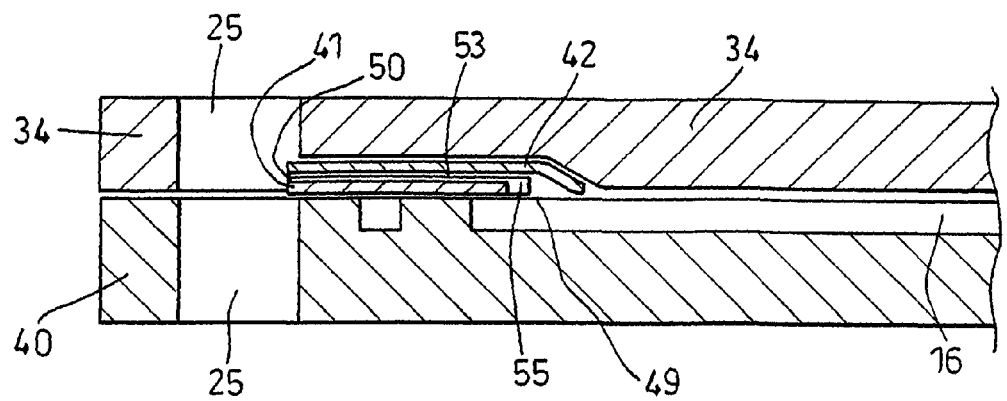
FIG. 6 shows a cross-sectional view of the fluid flow field plate, water distribution foil and cover foil of FIGS. 4 and 5.

It is noted that the foil layers are very thin compared with the plate 40 thickness, the thickness of the foil layers being easily absorbed by the MEA 34 and any gaskets interposed between the plates. The components in FIG. 6 are shown slightly separated for clarity, although they will, of course, be compressed together.

Figure 7:
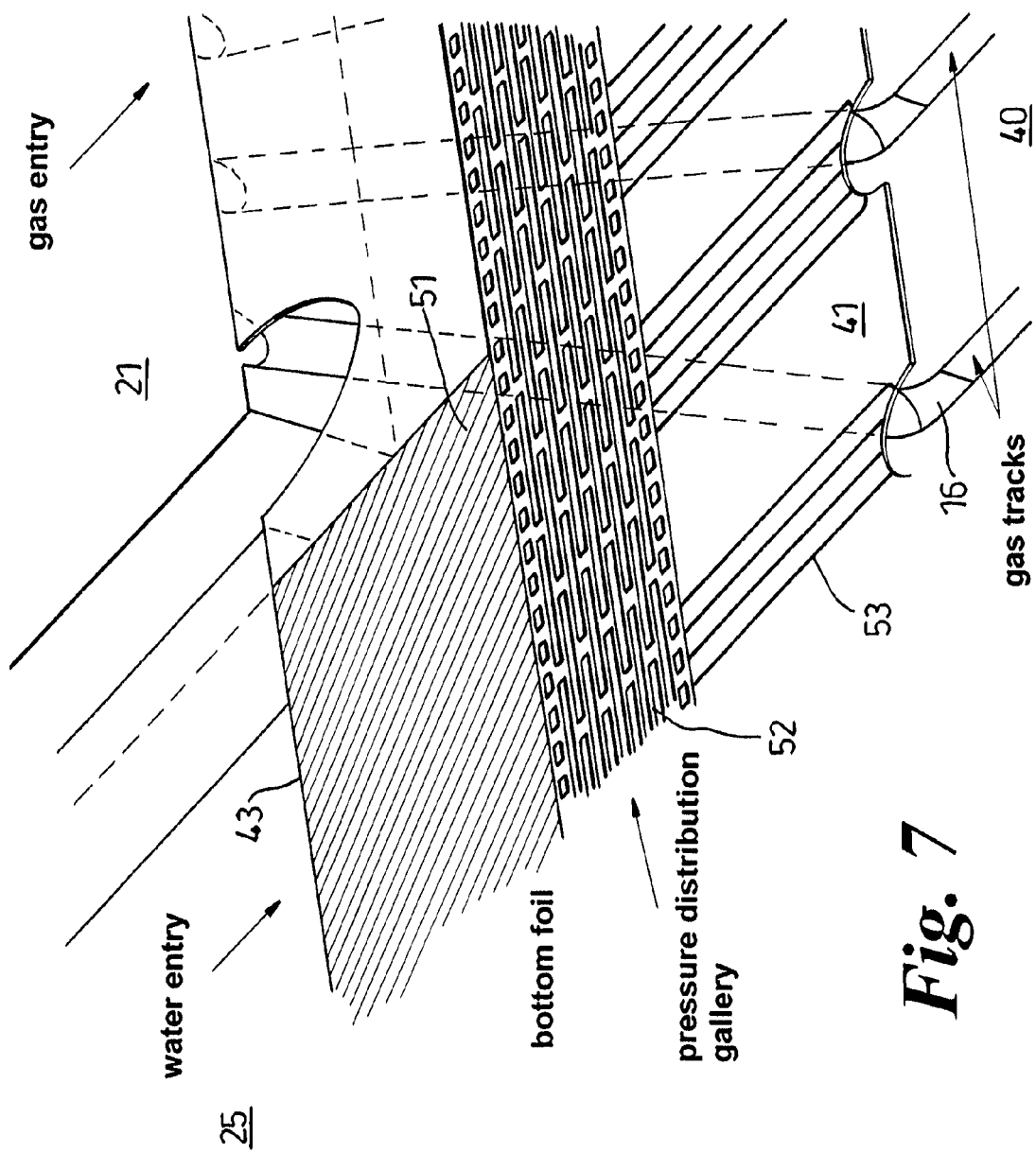
FIG. 7 shows a perspective view of part of the assembly of FIG. 6.

FIG. 7 shows a perspective diagram of the water distribution foil 41 in position over the flow field plate 40 showing alignment of the various channels and manifolds.

It will be recognised that the water distribution channels 51, 52, 53 need not be formed in the lower foil 41. In another embodiment, shown in FIG. 8, the water distribution channels 80 are formed in the lower surface of upper foil 82, while the lower foil 81 serves to form the closure of the channels 80 to form the water injection conduits. In other words, the distribution foil 82 and cover foil 81 are inverted compared with the arrangement of FIG. 6.

Figure 8:
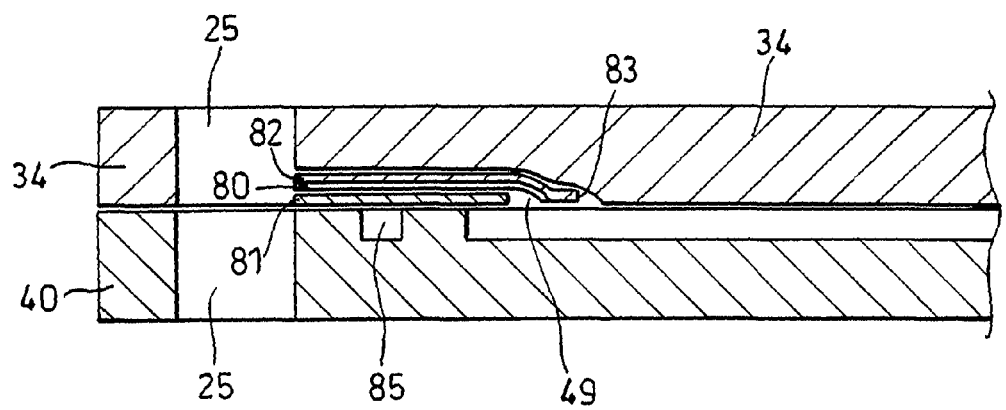
FIG. 8 shows a cross-sectional view of a fluid flow field plate, water distribution foil and cover foil in which the relative positions of the water distribution foil and cover foil are reversed.

In the FIG. 8 arrangement, at least the second series of channels (compare channels 53 in FIG. 5) will not extend right to the second edge 83 of the upper foil, but will terminate at positions proximal to the second edge. The lower (cover) foil 81 will extend almost to the end of the channels 80, but will preferably stop slightly short thereof in order that there is fluid communication from the end of the channel 80 into the plate channel 16 at the water injection points 49.

As indicated above, the lower (cover) foil 81 provides a closure to the channels 80 forming a barrier preventing water from escaping into underlying channels 16 in the fluid flow plate 40 in the wrong places, eg. where the water injection conduits traverse the fuel and/or oxidant channels 16 (eg. at location 85).

Preferably, the foils as described above are formed from a metal, such as stainless steel. However, any suitable material having appropriate pressurised water containment properties could be used, and the expression "foil" used throughout the present specification is to be construed accordingly. Preferably, the foils are electrically conductive but they need not be so, since they do not impinge on the active area of the MEA.

In a preferred embodiment, the fluid flow channels 16 in the anode or cathode plates 40 are typically between 0.4 mm and 1.2 mm in width and depth. It is found that a channel width and depth of 10 microns, chemically etched into the water distribution foil, serves to provide the necessary degree of water injection.

In use, the pressure of water being delivered via manifold 25 is controlled to ensure a significant pressure difference between the water supply and the gas pressure in the fluid flow channels 16, achieving an equal distribution of water between the thousands of flow paths. In the preferred embodiment, water is delivered to the manifold at a gauge pressure in the range 0.5-3 bar $H_2O$.

An advantage of this approach is that the water distribution membrane is extremely thin and can easily be located within the available space within bipolar plates or in the gasket area.

The volumetric water dispensing accuracy can also be very precisely controlled by suitable design of the water injection conduit pattern and channel dimensions.

Figure 9:
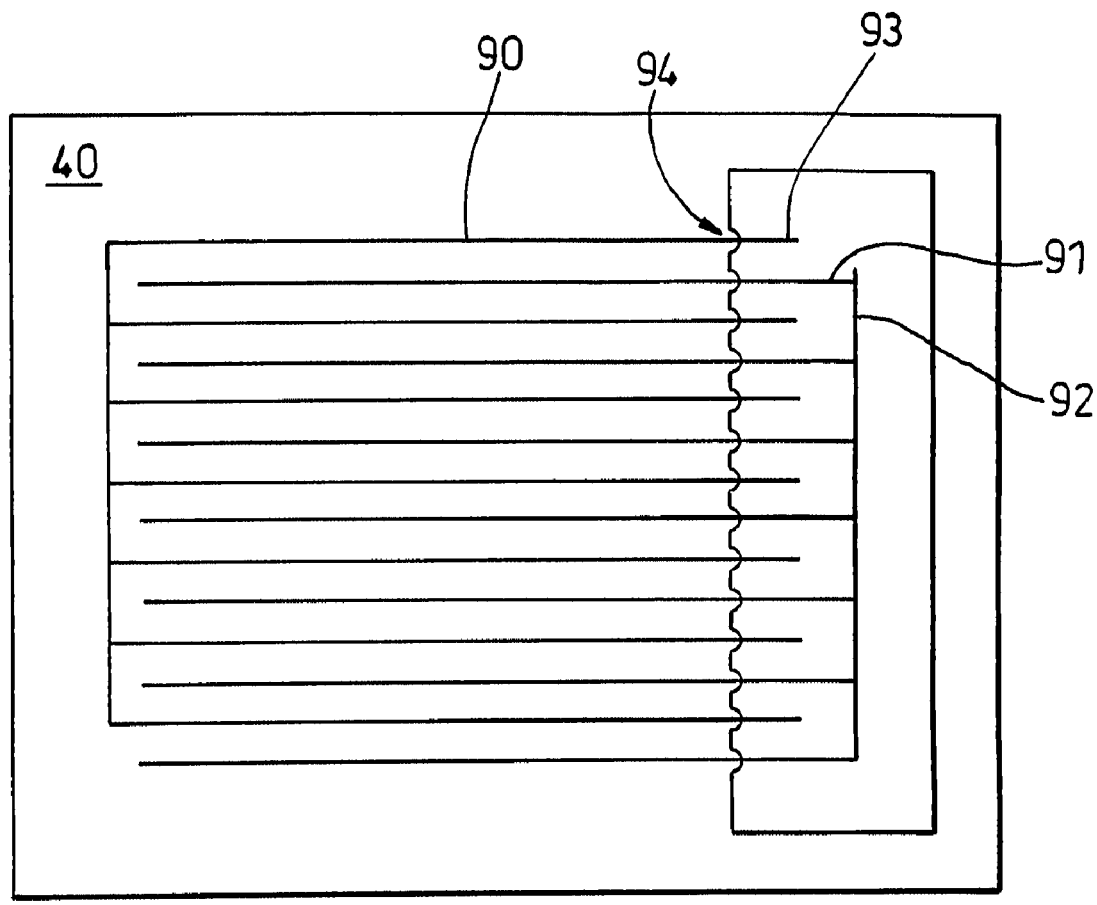
FIG. 9 shows a schematic plan view of water injection points for an interdigitated comb channel structure.

As illustrated in FIG. 9, water that is dispensed into interdigitated channels 90 in the flow field plate 40 can be introduced at either the entry point 91 to the channel, after the feeder channel 92, or alternatively into the exit track 93 at an injection point 94 at the same end of the bipolar plate as the feed manifold.

An advantage of water injection into the exit tracks is a reduction of pressure drop in reactant gas flows. This is because the water does not pass through the diffusion medium causing masking of void space for the gas passage. Similarly the elimination of water flow through the diffusion medium will also reduce the attrition of the medium and its gradual fragmentation and structural deterioration.

The evaporative cooling process is effective in the exit tracks and water content of the membrane is maintained due to saturation of the air with water vapour.

Other embodiments are intentionally within the scope of the accompanying claims.

The invention claimed is:

1. A method of operating an electrochemical fuel cell stack comprising a plurality of fuel cells, each of the fuel cells comprising an anode, an ion transfer membrane, and a cathode, the method comprising:
    delivering fluid fuel to one or more fluid flow channels in each anode of one or more fuel cells in the electrochemical fuel cell stack;
    delivering fluid oxidant to one or more fluid flow channels in each cathode of the one or more fuel cells;
    exhausting reaction by-products and unused oxidant from the one or more fluid flow channels in each cathode of the one or more fuel cells; and
    delivering a sufficient quantity of liquid water to the one or more fluid flow channels in each cathode of the one or more fuel cells such that a relative humidity of 100% is maintained throughout the one or more fluid flow channels in each cathode of the one or more fuel cells;
    wherein delivering the sufficient quantity of liquid water comprises:
        determining, for each of a plurality of currents, a maximum voltage for the one or more fuel cells as a function of liquid water flow rate, the each of a plurality of currents being within a range of operating conditions of the one or more fuel cells;
        determining a calibration function expressing a minimum liquid water flow rate as a function of current and/or air stoichiometry, the calibration function being determined by variation of water flow rate to the cathode operating at constant current and constant air stoichiometry to determine minimum and maximum water flow rates repeated for a plurality of stack currents or air stoichiometries; and
    delivering at least the minimum liquid water flow rate for a corresponding current drawn from the one or more fuel cells and/or for the air stoichiometry, the delivered minimum liquid water flow rate being determined by the calibration function.

2. The method of claim 1, wherein the one or more fuel cells comprises less than all fuel cells in the electrochemical fuel cell stack.

3. The method of claim 1, wherein the one or more fuel cells comprises all fuel cells in the electrochemical fuel cell stack.

4. The method of claim 1, further comprising:
    increasing a quantity of liquid water delivered to one or more fluid flow channels of each cathode of the one or more fuel cells as a function of fuel cell current in order to maintain a water factor greater than 1.0 for all currents within an operating range of the one or more fuel cells.

5. The method of claim 1, wherein the calibration function is determined for air stoichiometry in a range 1.1 to 10.

6. The method of claim 1, wherein the calibration function is determined for air stoichiometry in a range 1.4 to 4.0.

7. The method of claim 1, wherein delivering the sufficient quantity of liquid water comprises delivery of a water factor of at least 1.5.

8. The method of claim 1, wherein delivering the sufficient quantity of liquid water comprises delivery of a water factor of at least 3.

9. The method of claim 1, wherein delivering the sufficient quantity of liquid water comprises delivery of a water factor of less than 40.

10. The method of claim 1, wherein delivering the sufficient quantity of liquid water comprises delivery of a water factor in the range from 3 to 6.

11. The method of claim 1 further comprising:
temporarily permitting delivery of a quantity of liquid water to one or more fluid flow channels of a cathode of the one or more fuel cells such that a relative humidity of less than 100% is maintained when an exhaust temperature of the cathode is below a predetermined threshold corresponding to a sub-optimal operating temperature.

12. The method of claim 11, which is applied upon start-up of the fuel cell.

13. The method of claim 1, wherein a fuel cell among the one or more fuel cells is operated such that, for any measured fuel cell power delivery, a liquid water injection rate into a cathode of the fuel cell and/or gas flow through the cathode are controlled to ensure that there is more liquid water in all regions of a surface of the cathode than can be evaporated in prevailing temperature and pressure conditions.

14. The method of claim 13, which is performed on a plurality of fuel cells in the electrochemical fuel cell stack having a common oxidant supply manifold and a common water injection manifold such that, for any measured stack power delivery, liquid water injection rate into the common water injection manifold and/or gas flow rate in the common oxidant supply manifold are controlled to ensure that there is more liquid water in all regions of cathode surfaces of all of the plurality of fuel cells than can be evaporated in prevailing temperature and pressure conditions.

* * * * *

UNITED STATES PATENT AND TRADEMARK OFFICE
CERTIFICATE OF CORRECTION

| | | |
|---|---|---|
| PATENT NO. | : 8,277,998 B2 | Page 1 of 1 |
| APPLICATION NO. | : 10/584780 | |
| DATED | : October 2, 2012 | |
| INVENTOR(S) | : Jeremy Stephen Matcham et al. | |

It is certified that error appears in the above-identified patent and that said Letters Patent is hereby corrected as shown below:

Title Page, item (75), Column 1, Inventors:
Delete "Norringham" and Insert -- Nottingham --

Title Page, item (75), Column 1, Inventors:
Delete "West Yorkshire" and Insert -- Leicestershire --

Signed and Sealed this
Twenty-sixth Day of February, 2013

Teresa Stanek Rea
*Acting Director of the United States Patent and Trademark Office*